US010904015B2

(12) United States Patent
Loreskar et al.

(10) Patent No.: US 10,904,015 B2
(45) Date of Patent: Jan. 26, 2021

(54) POST-MANUFACTURE GENERATION OF DEVICE CERTIFICATE AND PRIVATE KEY FOR PUBLIC KEY INFRASTRUCTURE (71) Applicant: Trustonic Limited, Cambridge (GB)

(72) Inventors: Chris Loreskar, Cambridge (GB); Alec Milne Edgington, Cambridge (GB); John Dent, Cambridge (GB); Jan-Erik Gustav Ekberg, Cambridge (GB)

(73) Assignee: Trustonic Limited, Cambridge (GB)

( * ) Notice: Subject to any disclaimer, the term of this patent is extended or adjusted under 35 U.S.C. 154(b) by 113 days.

(21) Appl. No.: 16/118,579

(22) Filed: Aug. 31, 2018

(65) Prior Publication Data
US 2019/0074981 A1 Mar. 7, 2019

(30) Foreign Application Priority Data

Sep. 1, 2017 (GB) .................... 1714064.1

(51) Int. Cl.
G06F 21/33 (2013.01)
H04L 9/32 (2006.01)
(Continued)

(52) U.S. Cl.
CPC ............ H04L 9/3265 (2013.01); G06F 21/33 (2013.01); H04L 9/007 (2013.01); H04L 9/0861 (2013.01);
(Continued)

(58) Field of Classification Search
CPC ..... H04L 9/3265; H04L 9/007; H04L 9/0861; H04L 9/14; H04L 9/30; H04L 9/3242; H04L 9/3268; G06F 21/33
See application file for complete search history.

(56) References Cited

U.S. PATENT DOCUMENTS 9,069,703 B2 * 6/2015 Raam .................... G11C 16/22
9,087,012 B1 * 7/2015 Hayes ................. H04L 67/1095
(Continued)

FOREIGN PATENT DOCUMENTS

WO 2008/057156 5/2008

OTHER PUBLICATIONS

Combined Search and Examination Report dated Feb. 6, 2018 in GB Application No. 1714064.1, 8 pages.
(Continued)

Primary Examiner — Joseph P Hirl
Assistant Examiner — Stephen T Gundry
(74) Attorney, Agent, or Firm — Nixon & Vanderhye P.C.

(57) ABSTRACT

A method of post-manufacture generation of the device certificate 20 for verifying an electronic device 2 according to a public key infrastructure is provided. The method comprises obtaining, at a certificate generating apparatus 40, a first key 42 associated with the device 2. A second key 22 for the electronic device is derived from the first key 42. The device certificate 20 for the PKI is generated with the second key acting as the public key 22 associated with the device certificate 20. In a corresponding way a private key 24 for the PKI can be generated by the electronic device 2 based on a shared first key 42. This approach enables the manufacturing cost for manufacturing an electronic device to be reduced whilst still enabling use of a PKI for attesting to properties of the device 2.

18 Claims, 5 Drawing Sheets (51) Int. Cl.
  *H04L 9/00*  (2006.01)
  *H04L 9/08*  (2006.01)
  *H04L 9/14*  (2006.01)
  *H04L 9/30*  (2006.01)

(52) U.S. Cl.
  CPC .................. *H04L 9/14* (2013.01); *H04L 9/30* (2013.01); *H04L 9/3242* (2013.01); *H04L 9/3268* (2013.01)

(56) References Cited

U.S. PATENT DOCUMENTS

| | | | | |
|---|---|---|---|---|
| 2006/0059333 | A1* | 3/2006 | Gentry | H04L 9/3236 713/156 |
| 2009/0031140 | A1* | 1/2009 | Abdallah | H04L 9/3231 713/186 |
| 2010/0031025 | A1 | 2/2010 | Zhang | |
| 2010/0162003 | A1* | 6/2010 | Dodgson | G06F 3/067 713/193 |
| 2010/0162004 | A1* | 6/2010 | Dodgson | H04L 9/0894 713/193 |
| 2010/0169661 | A1* | 7/2010 | Summers | G06F 21/80 713/189 |
| 2010/0169662 | A1* | 7/2010 | Summers | G06F 21/80 713/189 |
| 2011/0029771 | A1 | 2/2011 | Mehta | |
| 2013/0086303 | A1* | 4/2013 | Ludwig | G06F 21/79 711/103 |
| 2013/0311789 | A1* | 11/2013 | Johnson | G06F 21/6227 713/193 |
| 2014/0040639 | A1* | 2/2014 | Raam | G11C 16/22 713/193 |
| 2014/0059278 | A1* | 2/2014 | Schuh | G11C 29/26 711/103 |
| 2014/0108796 | A1* | 4/2014 | Johnson | G06F 21/6272 713/167 |
| 2014/0129844 | A1* | 5/2014 | Johnson | G06F 21/78 713/189 |
| 2014/0164790 | A1* | 6/2014 | Dodgson | G06Q 10/10 713/193 |
| 2015/0100720 | A1* | 4/2015 | Flynn | G06F 3/0619 711/103 |
| 2015/0355984 | A1* | 12/2015 | Hayes | H04L 9/085 714/6.3 |
| 2016/0004877 | A1* | 1/2016 | Hayes | H04L 9/0861 713/165 |
| 2016/0171439 | A1* | 6/2016 | Ladden | G06F 3/0481 705/340 |
| 2016/0293274 | A1* | 10/2016 | Schuh | G11C 29/16 |
| 2017/0012783 | A1* | 1/2017 | Moses | G06K 9/00 |
| 2017/0132433 | A1* | 5/2017 | Srinivasan | G06F 21/73 |
| 2017/0347223 | A1* | 11/2017 | Robba | G06F 21/445 |
| 2018/0034642 | A1* | 2/2018 | Kaehler | H04L 63/101 |
| 2018/0063123 | A1 | 3/2018 | Tempel | |
| 2018/0159845 | A1 | 6/2018 | Aronov | |
| 2018/0198765 | A1* | 7/2018 | Maybee | H04L 63/0428 |
| 2018/0248702 | A1* | 8/2018 | Wu | H04L 9/3236 |
| 2018/0287802 | A1* | 10/2018 | Brickell | H04L 9/14 |
| 2019/0028281 | A1* | 1/2019 | Turissini | G06F 21/72 |
| 2019/0073152 | A1* | 3/2019 | Nagle | H04L 9/0894 |
| 2019/0074981 | A1* | 3/2019 | Loreskar | H04L 9/007 |
| 2019/0272378 | A1* | 9/2019 | Hirvimies | G06F 21/577 |
| 2019/0340136 | A1* | 11/2019 | Irwin | G06F 3/0683 |

OTHER PUBLICATIONS

Extended European Search Report dated Nov. 7, 2018 in EP Application No. 18191657.8, 7 pages.
U.S. Appl. No. 16/114,556, filed Aug. 28, 2018, Loreskar.
Office Action dated May 29, 2020 for U.S. Appl. No. 16/114,556, 20 pages.

* cited by examiner

POST-MANUFACTURE GENERATION OF DEVICE CERTIFICATE AND PRIVATE KEY FOR PUBLIC KEY INFRASTRUCTURE

This application claims priority to GB Patent Application No. 1714064.1 filed Sep. 1, 2017, the entire contents of which are hereby incorporated by reference.

The present application relates to the field of electronic devices. More particularly, it relates to providing a chain of trust according to a public key infrastructure.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it can be important for a service provider to be able to verify that the electronic device meets certain requirements in order to trust that interaction with the electronic device is secure. The service provider may need to have confidence that the device has certain properties, e.g. that it was made by one of a group of trusted manufacturers, that it passed a certain quality assurance step, or that it has a certain hardware component or software application installed. Cryptographic techniques can be used to provide the required root of trust. For example a cryptographic key may be embedded in the device during manufacture and the device can later use that key to attest to an external verifier that the device has the properties expected by the verifier.

At least some examples provide a method for post-manufacture generation of a device certificate for verifying an electronic device according to a public key infrastructure, comprising:
obtaining, at a certificate generating apparatus, a first key associated with the electronic device;
deriving a second key for the electronic device from the first key; and
generating the device certificate for the public key infrastructure, wherein the second key is a public key associated with the device certificate.

At least some examples provide a certificate generating apparatus for post-manufacture generation of a device certificate for verifying an identity of an electronic device according to a public key infrastructure, comprising:
processing circuitry configured to:
obtain a first key associated with the electronic device;
derive a second key for the electronic device from the first key; and
generate the device certificate for the public key infrastructure, wherein the second key is a public key associated with the device certificate.

At least some examples provide a method for post-manufacture generation of a private key for attestation for an electronic device according to a public key infrastructure, comprising:
obtaining a first key stored by the electronic device;
deriving from the first key a private key associated with the electronic device in the public key infrastructure; and
making the private key available for the electronic device to sign a subsequent message to be verified according to the public key infrastructure.

At least some examples provide an electronic device comprising:
processing circuitry configured to:
obtain a first key stored by the electronic device;
derive from the first key a private key associated with the electronic device in a public key infrastructure; and
make the private key available for the electronic device to sign a subsequent message to be verified according to the public key infrastructure.

At least some examples provide a computer program for controlling a data processing apparatus to perform any of the method described above. The computer program may be stored on a storage medium. The storage medium may be a non-transitory storage medium.

Further aspects, features and advantages of the present technique will be apparent from the following description of examples, which is to be read in conjunction with the accompanying drawings, in which:

In a public key infrastructure (PKI), an electronic device may hold a private key which can be used to sign messages, and a corresponding device certificate holds a public key corresponding to the private key, which can be used to verify the messages from the device to check that they were signed with the correct private key. Typically, the key pair and certificate are generated during the manufacturing of a device. Either the key pair can be generated by the device itself, or the key pair can be generated by the manufacturer and then injected into the device during the manufacturing process. If the key is generated by the device itself this is more secure, because the private key need not be exposed outside the device, but there is more time during production because the device has to be booted to create the keys and output the public key/certificate to the manufacturer. If the private key is injected from the manufacturer then the solution is a little less secure, but still adds some time during the manufacturer in order to write the key to the device. Hence, having a certificate created during the device's passage through a factory line increases the time spent by the device on the manufacturing line, and hence increases cost. Also, securely handling the keys associated with the device certificate can require a hardware security module (HSM) or other components for signing certificates which can increase the cost of manufacturing.

The inventors recognised that there are a class of devices for which this added cost is typically not justified, although it would still be useful to be able to provide the ability to enrol the device in a public key infrastructure. For example, for sensors within the Internet of Things, such as personal fitness monitoring devices or temperature sensors for use in a home air conditioning or heating system for example, the cost of the sensor may be low and the power and storage capacity of the devices may be constrained. It may be desirable for such Internet of Things type devices to be able to attest to some property of the device when accessing a given cloud service. For example the cloud provider may wish to check that the device is one of a known set of devices manufactured by a trusted manufacturer, or that the device has a certain component installed in it, or simply that the device is a legitimate device and not a fake copy or blacklisted device. These types of attestations can benefit from use of the public key infrastructure, but existing manufacturing techniques for manufacturing the devices with the required key pair and device certificate, recording the public component of the key pair and making public the device certificate and public key, while maintaining sufficient security of the keys, tend to make the manufacturing costs higher (due to the increased manufacturing time) which may not be justified given the low cost of such Internet of things type devices.

The techniques described below address these issues by providing a method for post-manufacture generation of a device certificate (and corresponding private key and public key) for verifying an electronic device according to a public key infrastructure. The private key and certificate/public key can be generated at different devices after the electronic device has already been manufactured, derived from a first key associated with the electronic device which may be provided during manufacture or later on in the devices lifetime. The public key and certificate for the device may be generated at a certificate generating apparatus, while the private key for the device may be generated at the electronic device itself. The processes for generating the certificate and public key on the one hand, and the private key on the other hand, may be entirely disjoint and need not be performed at the same time. For example, the private key for the device may be generated before the certificate has been generated and so messages could be signed using the private key before the device certificate even exists yet.

Hence, a method for post-manufacture generation of a device certificate for verifying an electronic device according to a PKI comprises obtaining, at a certificate generating apparatus, a first key associated with the electronic device, deriving a second key for the electronic device from the first key, and generating a device certificate for the PKI where the second key is the public key associated with the device certificate. This approach is counterintuitive since one would normally assume that implementation of a PKI requires the certificate and public key to be generated securely during the device manufacture, rather than being derived from a shared first key at a separate certificate generating apparatus after the manufacture of the electronic device. This can be particularly useful for relatively low power devices where the added cost of the delay in manufacture associated with the key provision and certificate generation/sharing may not be justified, but it will be appreciated that the same post-manufacture certificate generation technique could also be used for larger more powerful devices such as mobile telephones or tablet computers.

In one example, the first key may be a symmetric key which is identical to a corresponding key held by the device (which can be used by the device to generate the corresponding private key for the PKI). Hence, a symmetric key embedded in the device during manufacture can be shared with a certificate generating apparatus, and then this enables both the certificate generating apparatus and the device to generate the respective parts of the key pair used for establishing the PKI. This contrasts with typical approaches in which one would generate PKI keys in a factory-controlled secure environment, either by the device generating the keypair and providing the public key to the production station which enrols the public key into a certificate chain; or by the production station injecting the private key into the device, retaining the public key and enrolling the public key into the certificate chain. Instead, by having a shared symmetric key persisting in the device itself and also outside the device (in the certificate generating apparatus) from which PKI keys can be generated subsequently outside the factory-controlled secure environment, the cost of manufacturing can be reduced.

Security measures can be taken to prevent leakage of the symmetric key and/or the key generation function used to derive the second key from the first key. For example, the certificate generating apparatus may be operated by a certifying body and need not be web-facing server so that it is not possible to access the certificate generating apparatus from a remote source. For the parts of the key generation performed by the electronic device itself, these could be controlled by trusted software applications executing within a trusted execution environment which is separated by a hardware architecture from a normal execution environment which runs normal non-trusted applications. For example an architecture such as the TrustZone® architecture provided by ARM® Limited of Cambridge, UK, could be used to isolate the trusted execution environment from the normal execution environment to prevent applications in the normal execution environment gaining access to code executed in the trusted execution environment, in order to prevent leakage of the key derivation function.

The first key obtained by the certificate generating apparatus may be an uncertified key which does not have a corresponding device certificate.

The second key may be generated by performing an asymmetric key generating algorithm based on a seed value provided by the first key. For example, an RSA, DSA or ECC (Elliptic Curve Cryptography) algorithm could be used, or the keys could be generated by applying a cryptographic hashing algorithm (e.g. SHA) to a value derived from the seed value.

The device certificate may be generated without transmission of the public key or a corresponding private key between the electronic device and the certificate generating apparatus. Hence, no network connection is needed between the device and the certificate generating apparatus during the certificate generating process, as the already shared first key may be enough to establish the key material required for setting up the device's attestation keys within the public key infrastructure. Hence, this technique is useful for low power Internet of Things type devices which may not have a remote network connection, but could simply be devices which communicate by direct device-to-device communication, or through a local area network.

The first key may be obtained by the certificate generating apparatus from a device receipt provided by a manufacturer of the electronic device. The device receipt could, in addition to the first key, specify additional information to be included within the generated device certificate, such as a device identifier or information indicating certain properties of a device attested to by the manufacturer so that third parties can verify from the device certificate whether the device meets the required properties needed by that verifier. For example, device receipts for a manufactured batch of devices could be uploaded to the certificate generating apparatus following completion of manufacture, or at some offline time separate from the manufacture of the devices. In some cases the device certificate could be generated in response to upload of the device receipt to the certificate generating apparatus, without waiting for the device actually to become operational or for a certificate to be requested from a verifier.

The device certificate can be made available to a verifier apparatus for verifying the electronic device based on the device certificate. For example the certificate can be made available to the verifier either by transmitting it directly to the verifier or by storing it to some publicly accessible location from which the verifier can access the certificate.

In some examples the device certificate may be generated in response to a request from the verifier apparatus. For example the request from the verifier apparatus may be triggered by the electronic device seeking to access a service associated with the verifier apparatus, or by a message from the electronic device which needs to be verified by the verifier apparatus. In some cases the device certificates could be created on the fly each time a verifier apparatus requests the certificate, and then discarded without any persistent storage of the certificate. In other examples the device certificate may be generated the first time a request for a given electronic device is received from a verifier apparatus, but thereafter may be stored in a publicly accessible location so that on subsequent requests from verifiers it is not necessary to generate a certificate again. Once the device certificate has been made available to the verifier apparatus (either directly or via a server), the device certificate may be discarded by the certificate generating apparatus in some examples.

Hence, if device certificates are generated upon request from a verifier apparatus, then it is possible that the electronic device may start signing messages using the private key for the PKI before any corresponding device certificate and public key has yet been generated by the certificate generating apparatus.

As mentioned above, in some examples the device certificate may be made available by storing it to a server for subsequent access by a verifier. The first key could be discarded after storing the device certificate to a server, to reduce the likelihood of leakage of the first key. The device certificate could be stored to a location on the server which is identified by a certain file path, which may for example be dependent on a device identifier of the electronic device. Hence, the file path could then be made available to a verifier in order to allow them to access the appropriate device certificate.

However, if certificates for devices are simply uploaded to file paths generated based on a device identifier, then as the certificate storing service is publicly accessible, it is possible that by crawling the certificate storing server, a malicious entity may be able to derive some information about a batch of devices. For example, the malicious entity may be able to determine how many legitimate devices were created in a given batch, or identify information on which devices have been made operational and have triggered generation of the corresponding certificate, which it may be undesirable to make public.

To reduce the chance of such side-channel information being accessible from the certificate storing server, the device certificate may be stored to a location on the server which is identified by a file path which obfuscated using an obfuscation key derived from the first key. The obfuscation key could be the same as the second key used as the public key in the PKI for the device, or could be another key derived from the first key which is different from the second key. By transforming the certificate file path in some way using the first key, this can reduce the chance that the storage location for a device having a given device identifier is predictable, to avoid sharing unintended information about how many devices of this specific set were actually shipped or have been enrolled into the PKI for example.

The file path for the certificate may be dependent on the result of a predetermined hash function or encryption applied to a device identifier of the electronic device using the obfuscation key. For example the hash function could be HMAC SHA256, or any other cryptographic hash function. In some examples, the result of the hash function or encryption may be used directly as the file path. However, in other examples the file path may comprise a number of levels of a folder structure and each level may be indexed based on a corresponding subset of bits of the result of the hash function applied to the device ID using the obfuscation key. The HMAC SHA256 function described above may generate a reasonably uniformly distributed output so that there may be an approximately equal distribution of device certificates under the different folders of the folder structure which can make management of the underlying file system simpler. Other cryptographic (one-way) hash functions may give a similar property, so the particular function HMAC SHA256 is not essential.

The device certificate may be generated according to a range of formats, but in one example may comprise an X.509 certificate. X.509 is a de facto standard for representing the certificates in a PKI and so by using this standard this improves interoperability with existing cloud service providers or verifiers.

In a corresponding way, a method for post-manufacture generation of a private key for attestation for an electronic device according to a PKI may be provided, comprising obtaining a first key stored by the electronic device, deriving from the first key a private key associated with the electronic device in the PKI, and making the private key available for the electronic device to sign a subsequent message to be verified according to the PKI. The private key may be generated once the device is already fully operational following completion of all the manufacturing process, and could be performed once the device is already in the hands of an end user for example.

In some cases, making the private key available for signing of messages may comprise storing the private key in the electronic device.

Alternatively, the private key could be generated on-the-fly each time a message needs to be signed, by repeating the steps for deriving the private key from the stored first key once more, and then forwarding the generated private key to the process or application signing the message, before discarding the private key without storing it in the electronic device.

The first key may be a symmetric key which is identical to a corresponding key held by certificate generating apparatus for generating a public key and device certificate corresponding to the private key in the PKI. The private key may be generated without generating a corresponding device certificate for the device, since the certificate can be generated instead by the certificate generating apparatus. The first key may be an uncertified key which does not have a corresponding device certificate. The private key may be generated without transmission of the private key or a corresponding public key between the electronic device and a certificate generating apparatus. Hence no network connection is required between the electronic device and the certificate generating apparatus in order to generate the respective portions of the keys required for the PKI.

In a corresponding way to the file path generation for certificate generating apparatus, the electronic device may also generate a certificate file path which can then be specified when sending a message signed using a private key, to enable a verifier device to obtain the device certificate from a remote location identified by the certificate file path. The electronic device itself never has to access the certificate file path and does not need to store its own device certificates. The certificate file path may be generated based on a device identifier of the electronic device, and can be obfuscated based on an obfuscation key derived from the first key, in a corresponding way to the obfuscation performed by the certificate generating apparatus.

After the private key has been generated by the electronic device, the first key can be discarded to save storage capacity on the device.

The methods discussed above can be implemented in bespoke hardware or in software executing on a general purpose processing unit.

Figure 1:
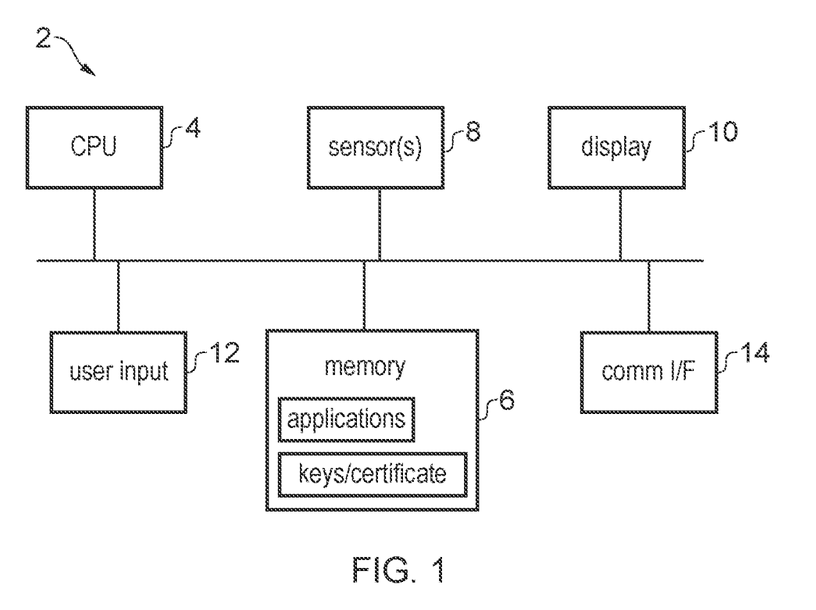
FIG. 1 schematically illustrates an example of an electronic device.

FIG. 1 schematically illustrates an example of an electronic device 2. The device 2 has processing circuitry (e.g. a central processing unit (CPU)) 4, and storage circuitry 6 (memory) for storing data and program code executed by the processing circuitry 4. The memory 6 may also store keys or certificates associated with a public key infrastructure. Clearly other data may also be stored within the memory 6. In some cases, the memory 6 may be partitioned into secure and less secure regions, with the secure region for example being accessible only from a trusted execution environment of the processing circuitry 4, while the less secure regions are accessible from both a trusted execution environment and a normal execution environment of the processing circuitry 4. Transitions of the processing circuitry 4 between the trusted execution environment and normal execution environment may be monitored and controlled according to a hardware architecture such as the TrustZone® architecture provided by ARM® Limited.

The device 2 may also have one or more sensors 8 for sensing external conditions such as temperature, pressure, infrared radiation, etc., a display 10 for displaying information to a user, a user input 12 for accepting input gestures from a user, and a communications interface 14 for communicating with other devices, for example through wireless protocols such as WiFi®, Bluetooth® or NFC, or through wired communications (e.g. Ethernet). It will be appreciated that FIG. 1 is just one example of a possible architecture for the device and other examples may have many other components shown in FIG. 1.

Figure 2:
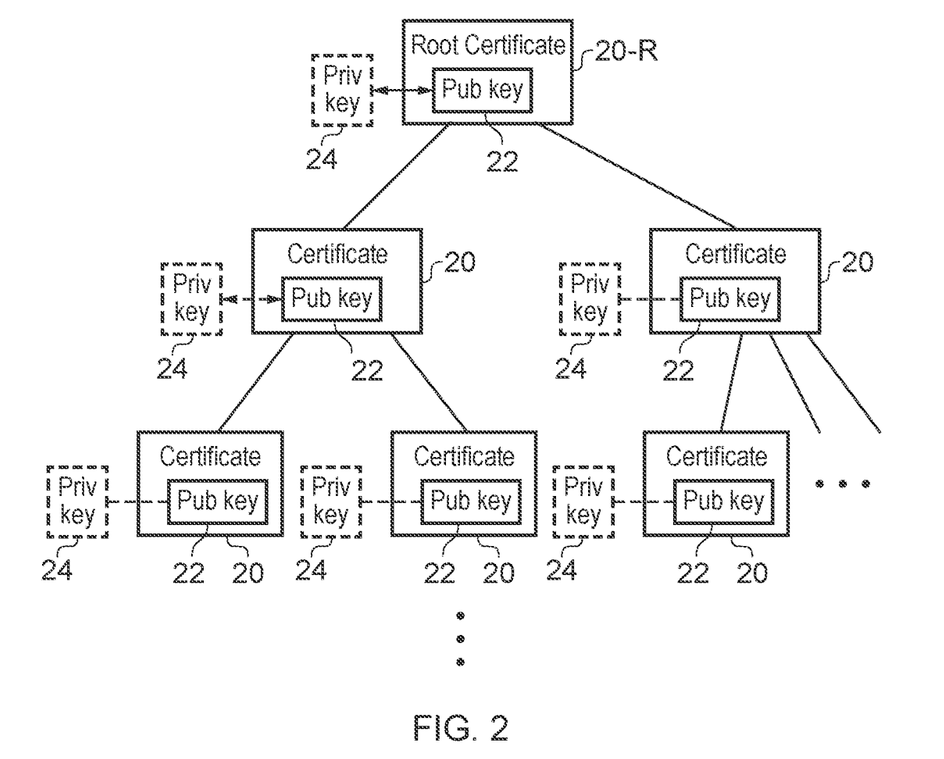
FIG. 2 illustrates a public key infrastructure.

FIG. 2 shows an example of a chain of trust provided by a public key infrastructure. The public key infrastructure is represented by a hierarchy of certificates 20 which can be used for verifying the source of messages. Each certificate 20 comprises a public key 22 which corresponds to a private key 24 held by the corresponding source to be attributed. For example, the private-public key pair could be a key-pair created according to RSA techniques or through elliptic curve cryptography. Trust in the chain of trust ultimately derives from a root certifying authority which is associated with a root certificate 20-R. The root certifying authority associated with the root certificate 20-R may attest as valid a number of child certificates for example corresponding to particular manufacturers of electronic devices (OEMs). Each OEM may then certify as valid particular electronic devices who may have their own certificates generated as children of the OEM certificates within the chain of trust. Hence, the chain of trust provides a tree of certificates, where a child certificate is attested as valid by an attestor associated with a parent certificate in the chain of trust. As the certificates are generated in successive generations, then when a particular certificate is determined to be valid, it can be implied that there was a chain of trust extending all the way back to the root certifying authority, giving confidence in the authenticity of the source of messages, but with the delegated attestation provided by the chain avoiding the complexity of a single certifying authority having to directly attest to each device or source of messages itself. The particular hierarchy where an OEM creates device certificates for its manufactured devices directly is not essential, and in other examples other parties may create certificates under the root of trust, or may be multiple levels of manufacturer certificate between the root certificate 20-R and a given device's certificate. In addition to the public key 22 the certificates may include other information associated with the corresponding source of messages being authenticated. The certificates could have any format, but in one particular example may be defined according to the X.509 standard.

Figure 3:
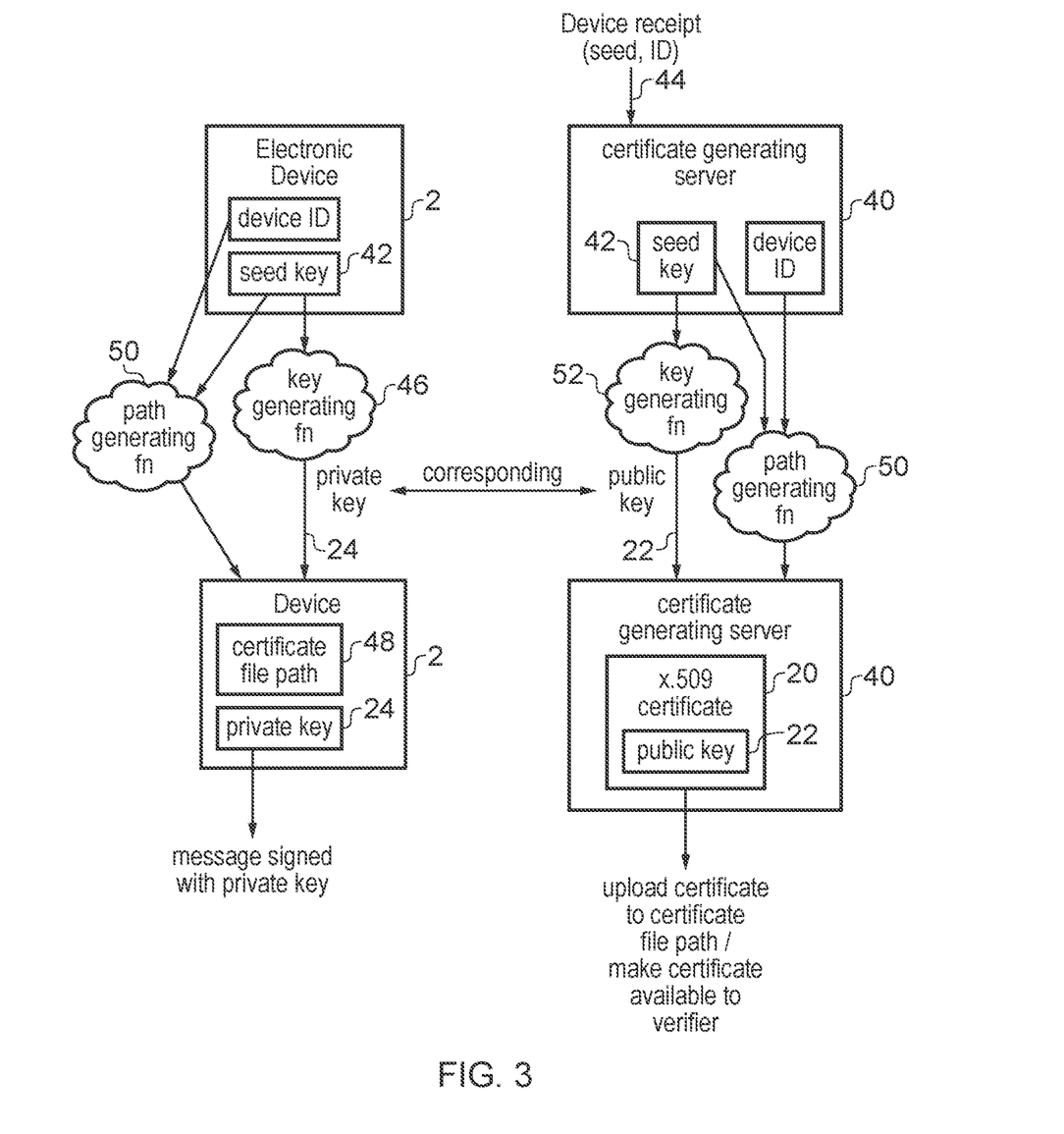
FIG. 3 shows an example of post-manufacture generation of a device certificate and key pair for a public key infrastructure for attesting to properties of an electronic device.

FIG. 3 schematically illustrates a technique for generating the certificate and public-private key pair for the PKI post-manufacturer of the device 2. FIG. 3 shows portions of the PKI generation process performed at the electronic device 2 and at a separate certificate generating server 40. The device has an embedded seed key 42 which is a symmetric key identical to a corresponding seed key 42 accessible to the certificate generating server 40. For example the seed key may be obtained from a device receipt 44 which is uploaded to a certificate generating server by the manufacturer of the electronic device 2. At some time after the manufacture of the device 2, the device applies a key generating function 46 to the seed key 42 in order to generate the private key 24 for the PKI which is stored on the device together with a certificate file path 48 which is generated by applying a path generating function 50 to the seed key 42. The path generating function can also depend on the device identifier associated with the device 2. The key generation function 46 could for example use an RSA or ECC based algorithm.

In a corresponding way the certificate generating server 40 applies a key generating function 52 to the seed key 42 in order to generate the public key 22 for the PKI which corresponds to the private key 24 generated by the device 2. In some examples the key generating function 52 could be identical to the function 46 used in the device 2 itself, with both functions 46, 52 generating a key pair, with the server 40 discarding the private key and the device 2 discarding the public key. No communication between the device 2 and the server 40 to exchange keys is required, and so the method provides for generation of the private and public components of a key pair at separate devices without any communication between those separate devices. The certificate generating server 40 also generates the certificate (for example an X.509 certificate) according to the PKI which holds the public key 22 generated using the key generating function 52. The private and public keys correspond in the sense that a message encrypted using the private key can be decrypted using the public key. The certificate generating server also applies the same path generating function as used by the electronic device to the seed key 42 and device ID 43 in order to generate a certificate file path, and then the certificate can be uploaded to a publicly accessible server and stored at the generated certificate file path. Also the certificate 20 could be made available directly to verifier devices on request. The certificate path could also be included in the certificate itself.

Hence, the generation of the certificate and key pair is split between devices and performed at a later time and then the manufacturing of the electronic device, in order to reduce the cost of device manufacture.

Figure 4:
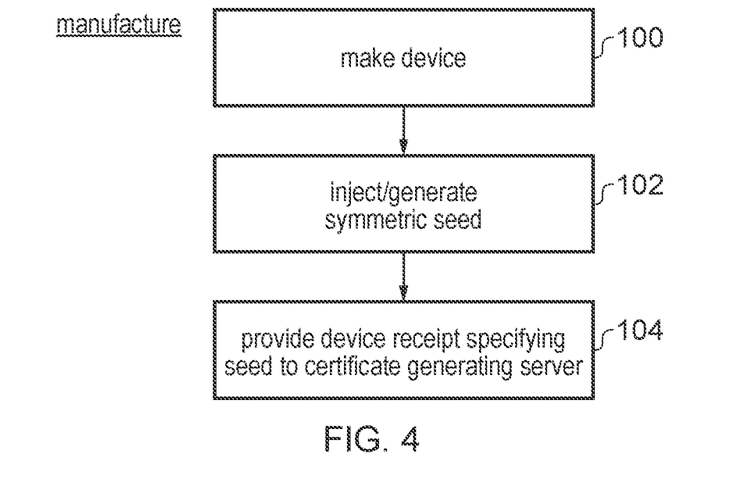
FIG. 4 is a flow diagram showing a method of manufacturing a device.

FIG. 4 schematically illustrates a method of manufacture of an electronic device. At step 100 the device is manufactured. At step 102 at some point during the manufacturing process the symmetric seed key 42 is embedded into the device 2, for example by storing the key 42 into secure storage within the device. Alternatively, the key 42 could be generated on the device itself, and fed back in encrypted form to include in a device receipt. Regardless of whether the key is generated outside the device and embedded into the device, or generated within the device, at step 104, a device receipt specifying the seed key 42 and device 43 is uploaded to a certificate generating server. The upload of a device receipt could be done while the device is being manufactured or subsequently in an offline process, for example as part of a batch upload of receipts for a batch of manufactured devices. In addition to the seed key 42, the device receipt could also include other information to be included in a subsequently generated device certificate according to the PKI. As an alternative to uploading the device receipt during the manufacture process, another approach can be to retain the device receipt on the device, and provide the device receipt to the remote server in a later receipt import process, separate from the processing performed in the factory during the manufacturing of the device.

Figure 5:
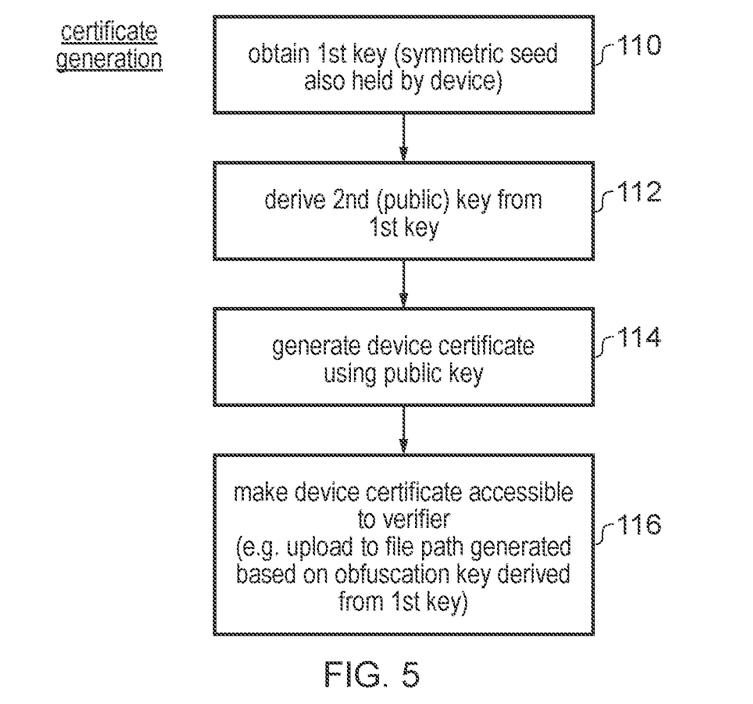
FIG. 5 is a flow diagram showing a method of generating a device certificate for the device.

FIG. 5 schematically illustrates method of generating the device certificate for an electronic device 2 according to a PKI. This method is performed at a certificate generating server 40 which is separate from both the electronic device 2 itself and the manufacturing line used to manufacture the device. The certificate generation could be triggered by either upload of the device receipt from the manufacturer, or by a subsequent request from a verifier indicating that a message from the device needs to be verified using the certificate.

At step 110 of FIG. 5, a first key is obtained by the certificate generation apparatus 40. The first key corresponds to the symmetric seed key 42 held by the device 2 and received in the device receipt. At step 112 the certificate generating apparatus 40 derives a second key from the first key, where the second key acts as the public key in the PKI associated with the electronic device 2. At step 114 a device certificate is generated using the generated public key. The device certificate may specify the public key as well as other information such as information indicating properties of the device which can be attested to when the device is able to prove that it has the private key corresponding to the public key. At step 116 the device certificate is made available to a verifier which needs to verify properties of the device based on the PKI. For example the device certificate can be made accessible to the verifier by transmitting it directly to the verifier or by storing it to a remote location which is accessible by the verifying. For example the device certificate can be uploaded to a file path generated based on the device ID and obfuscation key derived from the first key using the path generating function 50 as discussed below.

Figure 6:
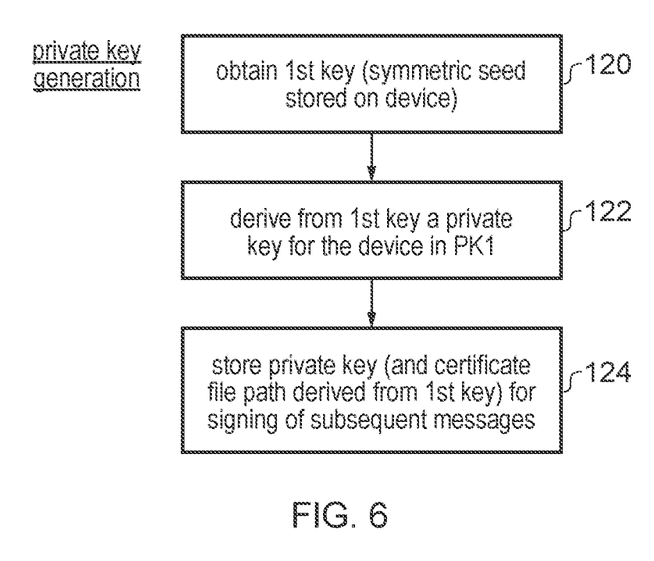
FIG. 6 is a flow diagram illustrating a method of generating a private key for the electronic device.

FIG. 6 is a flow diagram illustrating a method of generating the private key for the PKI at the electronic device. At step 120 the electronic device obtains the first key stored within the device, e.g. the symmetric seed key 42. At step 122 the electronic device applies the key generating function 46 to the first key to derive a private key 24 for the device according to the PKI. The device does not generate the corresponding public key and device certificate 20 as this is instead generated at the certificate server. At step 124 the private key is stored within the device, for example within a secure storage region which is protected from access from a normal execution environment by a hardware architecture which restricts access to the secure regions to a trusted execution environment executing within the processing circuitry of the device 2. In addition to the private key the device may also generate a certificate file path 48 which is derived from the first key 42 and device identifier 43. The certificate file path 48 is stored in memory of the device 2. When signing subsequent messages to be sent to a verifier to attest to a property of the device, the message can be signed using the private key and may be accompanied with the certificate file path, which the verifier can then use to request the corresponding device certificate from the certificate storing server. Alternatively, instead of storing the private key 24 and certificate file path 48 on the device itself, they could be generated on-the-fly by deriving them from the symmetric seed each time they are needed. Hence, in general, following the key derivation step 122, the private key may be made available for subsequent signing of messages, either by storing it on the electronic device or by forwarding it to the application or process which is signing the message.

A more detailed example of the technique discussed above is described below. The certificate holding the public part of a key pair is created entirely disjoint from the device itself, in a server which possesses relevant key material associated with said device. Trust can be established with the device, as the device can still sign assertions using its private key, for which this other entity (i.e. server) creates the actual certificate. Also, there is no network connection needed between the device and any servers for future reference in order for this attestation to work. The device can sign things, and a server can provide the corresponding certificate without the device ever needing to see it. We also solve the issue of device IDs being predictable, which arises when uploading device certificates to a publically facing web server, filed under the device identifier of the devices, which could disclose potentially sensitive information about volumes of devices manufactured/sold that the OEM might not wish to disclose. The proposal has the device derive an asymmetric key pair (i.e. the device key for the PKI), from a symmetric seed.

Factory (Time n):

When a device is in the factory, it receives, generates, or has injected, a key of some sort; either a shared symmetric one (or an asymmetric key pair). The exact type of key can vary, but the idea is that this device does not receive its corresponding certificate at this point in time, because that adds time to the manufacturing line, and also requires a hardware security module (HSM) connected to the factory line or device to create and subsequently sign the certificate. Instead, the certificate generation happens at a different time, later than the actual device manufacturing. The public key part (or the encrypted symmetric key) are then collected and transferred to the certificate generating server, or reside on the device and are later uploaded, e.g. when the device is enrolled or similar.

Certificate Generation (Time n+1):

At some point in time, the certificate generating server will receive the receipt(s) from a factory or the device(s) associated with the receipt(s) and will start processing them.

The server then has three choices:

1. Generate the device certificate during receipt import
2. Wait with the device certificate generation until someone actually asks for it
3. Store the certificate on a read-only publically facing web server for future retrieval Any of these approaches can be used. In one approach, once the certificate is created, it is transferred to a publically facing server for retrieval from some entity that requests it. The idea is then that the certificate is stored under the device ID of the device, i.e. GET/<DeviceID>HTTP/1.1. The full certificate chain all the way up to the root could optionally be stored on this server too, or elsewhere located.

However, as the identity of the device (Device ID) is somewhat predictable, this might share unintended information of how many devices of a specific set were actually shipped/created if this web server was crawlable by an external entity. To solve that, the actual path to where the device certificate is stored may be created by calculating a HMAC-SHA256 MAC over an obfuscation key derived from the same symmetric seed that was generated/injected by the device, which can be concatenated with a constant. This outputs a MAC on the form "aa bb cc . . . xx yy zz". From this resulting MAC, different subsets of bits (e.g. the last three bytes) are taken as indexes to the directories in which the device's certificate actually will reside in. For example:

GET/xx/yy/zz/<DeviceID>/HTTP1.1 where xx, yy, and zz all are hexadecimal ASCII represented values between "00" through "ff". The MAC transformation will yield a nicely uniformly distributed output such that there is a somewhat equal distribution of device certificates under the three different folders and eventually where the actual device certificate is stored. This is not an important feature per se, but might make the choice of the underlying file system easier if there is a predictable maximum of estimated certificates under any one folder.

Thus, once the certificate has been created, it can be uploaded to the web server and the designated directory path as outlined above.

Alternatively, if the certificate was not created during receipt import, rather when the request for the certificate came through the publically facing web site, the request would be forwarded to the certificate generating server which at that point in time would create the certificate on-the-fly and return it instead. The certificate could optionally be persisted in the publically facing web server, or it could be thrown away and re-created as required for the next request.

OTA (Over-the-Air) Initialization Time (in the Device) (n+2):

When the device left the factory, if it did not have an asymmetric key generated during manufacturing time, it now has to create one. The device will itself derive an asymmetric key from the symmetric seed. Once this has happened, the device can throw away the symmetric seed as it is no longer required. The same applies to the certificate server, although that is out of control from the device's point of view, although an equally important step in the system setting up the asymmetric key relationship.

The device also performs the operation to generate the certificate path as outlined above (of course before throwing away the symmetric seed).

Now the device and the sever share the same following properties:

Device certificate path on the remote server

Asymmetric (symmetric) key pair

The device then persists the device key and the certificate path for future reference.

Device:

Because the device now has what it needs in terms of the device key, it means when so requested, it can sign assertions which can be seen as attestations that a remote server can validate with use of the corresponding device certificate. Thus, the device can in fact be used for attestation purposes without actually having its own device certificate.

Also, when the device returns such assertions, they also include the device certificate path—otherwise the querying partner cannot validate said assertion. Do note, this path is not secret, as we do return it, but it is infeasible for an adversary to deduce it for a given device, and hence it becomes very hard for that party to try and count devices in the publically facing web server (also, traversing all 16 million directories and requesting all associated device certificates is unfeasible, as the web server could trivially deny directory traversal and thus the attacker has no way to perform such a count, or simply rate control the requests to a given connecting peer).

Remote Entity:

This entity (the verifier) is the one that asks the device for an attestation. Embedded within the attestation lies the device certificate path, which this entity extracts to query the web server for the corresponding device certificate. Once received, this entity can validate the certificate and based upon that perform subsequent operations (like installing a Trusted Application or personalizing), as the device thus must be genuine and not a counterfeit/emulator. The device certificate is chained all the way up to a given root certificate in the chain of trust provided by the PKI.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for post-manufacture generation of a device certificate for verifying an electronic device according to a public key infrastructure, comprising:

obtaining, at a certificate generating apparatus, the certificate generating apparatus being separate from the electronic device, either during or after manufacture of the electronic device, a first key associated with the electronic device;

applying, by the certificate generating apparatus after the manufacture of the electronic device, a key generating function to the obtained first key to derive a public key for the electronic device;

generating the device certificate for the public key infrastructure by the certificate generating apparatus after the manufacture of the electronic device, wherein the public key is associated with the device certificate; and wherein the device certificate is generated without transmission of the public key or a corresponding private key between the electronic device and the certificate generating apparatus.

2. The method of claim 1, wherein the first key is a symmetric key which is identical to a corresponding key held by the electronic device.

3. The method of claim 1, wherein the first key is an uncertified key which does not have a corresponding device certificate.

4. The method of claim 1, wherein the first key is obtained from a device receipt provided by a manufacturer of the electronic device.

5. The method of claim 4, wherein the device receipt specifies additional information to be included in the generated device certificate.

6. The method of claim 4, wherein the device certificate is generated in response to upload of the device receipt to the certificate generating apparatus.

7. The method of claim 1, comprising making the device certificate available to a verifier apparatus for verifying the electronic device based on the device certificate.

8. The method of claim 7, wherein the device certificate is generated in response to a request from the verifier apparatus.

9. The method of claim 8, comprising discarding the device certificate after making the device certificate available to the verifier apparatus.

10. The method of claim 7, wherein the device certificate is made available by storing the device certificate to a server for subsequent access by the verifier apparatus.

11. The method of claim 10, comprising discarding the first key after storing the device certificate to the server.

12. The method of claim 10, wherein the device certificate is stored to a location on the server identified by a file path dependent on a device identifier of the electronic device.

13. The method of claim 10, wherein the device certificate is stored to a location on the server identified by a file path obfuscated using an obfuscation key derived from the first key.

14. The method of claim 13, wherein the file path is dependent on a result of a predetermined hash function or encryption applied to a device identifier of the electronic device using the obfuscation key.

15. The method of claim 14, wherein the file path comprises a plurality of levels of a folder structure, each level indexed based on a corresponding subset of bits of the result of the predetermined hash function applied to the obfuscation key.

16. The method of claim 1, wherein the device certificate comprises an X.509 certificate.

17. A certificate generating apparatus for post-manufacture generation of a device certificate for verifying an identity of an electronic device according to a public key infrastructure, comprising:
processing circuitry configured to:
obtain a first key associated with the electronic device either during or after manufacture of the electronic device;
apply a key generating function to the obtained first key to derive a public key for the electronic device after the manufacture of the electronic device; and
generate the device certificate for the public key infrastructure after the manufacture of the electronic device, wherein the public key is associated with the device certificate; and
wherein the certificate generating apparatus is separate from the electronic device and the device certificate is generated without transmission of the public key or a corresponding private key between the electronic device and the certificate generating apparatus.

18. A non-transitory storage medium storing a computer program for controlling a data processing apparatus to perform the following steps:
obtaining, at a certificate generating apparatus, the certificate generating apparatus being separate from the electronic device, either during or after the manufacture of the electronic device, a first key associated with the electronic device;
applying, by the certificate generating apparatus after the manufacture of the electronic device, a key generating function to the obtained first key to derive a public key for the electronic device;
generating the device certificate for the public key infrastructure by the certificate generating apparatus after the manufacture of the electronic device, wherein the public key is associated with the device certificate; and
wherein the device certificate is generated without transmission of the public key or a corresponding private key between the electronic device and the certificate generating apparatus.

* * * * *